Sept. 15, 1959  J. CHAPLER, JR  2,904,130
CONSTRUCTION OF MULTIPLE TUBE CYCLONE DUST COLLECTOR
Filed Oct. 24, 1956
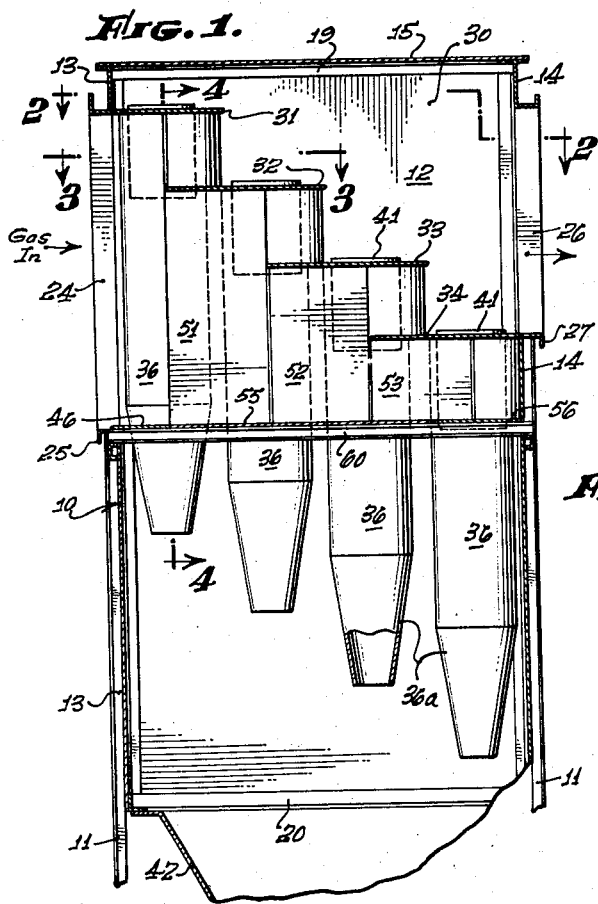
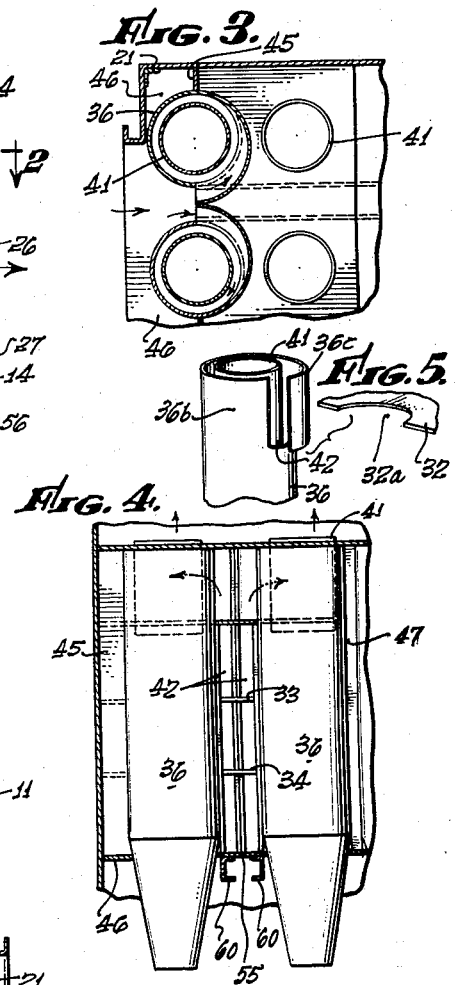
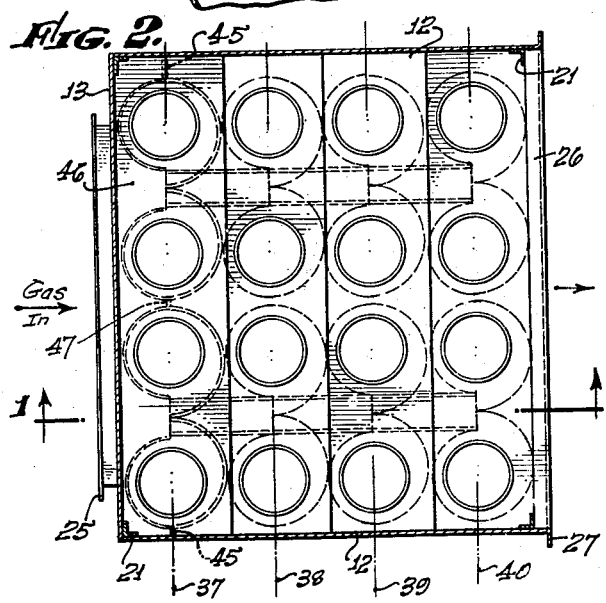
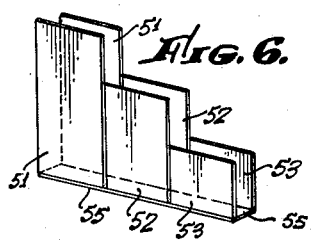
JAMES CHAPLER, JR.,
INVENTOR.
BY
*Knight & Rodgers*
ATTORNEYS

2,904,130

CONSTRUCTION OF MULTIPLE TUBE CYCLONE DUST COLLECTOR

James Chapler, Jr., Covina, Calif., assignor to Western Precipitation Corporation, Los Angeles, Calif., a corporation of California Application October 24, 1956, Serial No. 618,031

4 Claims. (Cl. 183—83)

This invention relates generally to means for treating gases in order to effect the separation of suspended material therefrom by centrifugal action; and it is concerned particularly with improvements in the design of a cyclone separator of the type having a plurality of separating tubes. More especially, this invention is concerned with improvements in the design of a cyclone dust collector of the type disclosed in the co-pending application of Norman M. McGrane, Serial No. 342,653, filed on March 16, 1953 (now Patent 2,768,744, dated October 30, 1953), for "Multiple Element Cyclonic Separator."

It is the general object of the present invention to effect improvements in the design of a dust collector of the type shown in the aforementioned co-pending application whereby certain parts are enabled to perform more than one function and other parts may be eliminated, thus resulting in a saving of materials and a reduction in weight of a dust separator designed to handle a given volume of gas.

This and other objects of my invention are achieved in novel constructions for a partition that in part defines the outlet chamber within the housing of the separator and for members which form inlet means for directing gas into the individual tubes and for supporting the weight of the separating tubes.

This partition is formed in apparatus of this type having a front gas inlet and a gas outlet for the housing by placing within the housing horizontal wall means comprising a plurality of individual plates which extend horizontally across the full width of the housing. These plates are spaced apart vertically and are disposed at different levels that are successively lower in the direction of gas flow through the front inlet of the housing. Below each one of these horizontal plates is located a transverse row of separating tubes which are connected to the plate to close the upper end of the tubes in the row.

Vertical wall means cooperate with the horizontal wall means to form the gas-tight partition between the housing inlet and outlet that defines a gas outlet chamber in communication with the outlet from the housing. This vertical wall means includes a plurality of arcuate walls which extend vertically between two of the above-mentioned horizontal plates and which are so disposed as to provide forwardly facing involute inlets for the separating tubes. Two successive horizontal plates thus close the bottom and the top of the involute inlet to confine the entering gas to the inlet.

The tubes in each transverse row are grouped in pairs with the arcuate walls of the inlets of the pair engaging each other at their outer ends. This arrangement spaces apart the two tubes of a pair sufficiently to permit gas to flow between them to reach the inlets of tubes in rows behind the first row. When there is more than one transverse row, all tubes are similarly arranged with the result that the several separating tubes are also lined up in longitudinal rows which extend parallel to the direction of gas flow through the inlet of the housing. Pairs of longitudinal rows that are spaced apart have between them vertical plates which define an inlet passage leading to rearward tubes. These vertical plates transmit the load imposed by the weight of the tubes to structural members upon which the vertical plates are supported at their bottom ends.

How the above and other objects and advantages of my invention are attained will be better understood by reference to the following description and to the annexed drawings, in which:

Fig. 1 is a vertical section through a dust collector constructed according to my invention, taken on line 1—1 of Fig. 2;

Fig. 2 is a horizontal section on line 2—2 of Fig. 1;

Fig. 3 is a fragmentary horizontal section on line 3—3 of Fig. 1;

Fig. 4 is a fragmentary vertical section on line 4—4 of Fig. 1;

Fig. 5 is a fragmentary exploded perspective view showing the upper end of one separating tube and the forward edge of one of the horizontal plates with a notch in it adapted to fit around the exterior of the separating tube; and Fig. 6 is a fragmentary perspective view of an assembly of vertically disposed plates that provide a longitudinally extending gas inlet passage to the separating tubes in the second and successive transverse rows.

The dust collector shown in the drawing comprises a rectangular housing generally designated at 10 mounted on an angle iron frame work that includes four legs 11. The housing may be made of metal sheets forming two spaced side walls 12, a front wall 13, a rear wall 14 and a top wall 15. The sheets forming these walls may be interconnected and reinforced by horizontal angles 19 and 20 on the top and bottom of the housing respectively, and by vertical angles 21 at the corners.

Housing 10 has a rectangular gas inlet opening 24 in the front wall 13 surrounded by an angle flange 25 to which suitable duct work, not shown in the drawing, may be connected. A similar rectangular gas outlet 26 is located in rear wall 14 and is likewise surrounded by an angle flange 27 to which an exhaust duct may be connected if desired. Alternatively, the gas outlet 26 may discharge directly to the atmosphere, as shown. The dust collector is not limited to an outlet opening in the rear wall, as the outlet opening, when more convenient, may be located in top wall 15 as shown in the above mentioned McGrane application.

Inside the housing there is constructed a gas-tight partition which is interposed between inlet 24 and outlet 26 and which in cooperation with the housing walls defines within the housing an outlet chamber 30 which is in communication with gas outlet 26. In general, this gas-tight partition is composed of horizontal wall means and vertical wall means which extend between elements of said horizontal wall means, as will be more particularly described.

The horizontal wall means within the housing comprises a plurality of horizontal plates 31, 32, 33 and 34 which extend across the full distances between side walls 12 and are connected at their ends to the side walls in a gas-tight manner. It will be noted that the horizontal plates are spaced apart vertically and are disposed at successively lower levels with reference to the direction of gas flowing into the housing through opening 24. Thus the front plate 31 is the highest, plates 32, 33, 34 being successively lower as they are farther removed from the gas inlet. The highest plate 31 is preferably in alignment with or a continuation of the upper wall of gas inlet 24, and thus connects to flange 25. In a similar manner the lowest plate 34 is preferably a continuation of the bottom wall of gas outlet 26 and connects to flange 27. The other two plates 32 and 33 are similar in size and shape.

A plurality of cyclonic dust-separating elements in the form of separating tubes 36 is located within housing 10. These tubes are arranged in a plurality of rows which extend transversely across the gas stream entering through inlet 24. The transverse axes of these rows are indicated at 37, 38, 39 and 40 in Fig. 2. All separating tubes 36 in each one of these transverse rows are connected at their upper ends to one of the horizontal plates. Thus the front row of four tubes along the axis 37 are connected to the front plate 31, while the next row of tubes along axis 38 is connected to plate 32, and so on. The open upper end of each separating tube is fully covered by the plate across the upper end of the tube 36 except for a gas outlet tube 41 which projects through the horizontal plate. A short tube 41 is located at the upper end of each separating tube 36 and concentrically thereof to provide an outlet for the cleaned gas leaving the separating tube. All outlet tubes 41 communicate with outlet chamber 30.

Tubes 36 are shown in Fig. 1 as being arranged with their longitudinal axes extending vertically, or substantially so, as this is a preferred arrangement; but the invention is not necessarily limited to a vertical position of the tube axes.

The design of the separating tubes is well known in the art and need not be described in detail here. However, it will be seen that each tube constitutes a cylindrical central section with a frusto-conical bottom section 36a. The lower end of each tube is open to the interior space within the lower portion of housing 10 so that dust separated from the suspended gas by centrifugal action is discharged from the open lower end of the tube into the housing from whence it falls by gravity into the hopper 42 below the housing.

Gas carrying suspended material to be separated enters each tube at the upper end thereof through an involute type of inlet. This involute section at the upper end of each tube is shown in some detail in Fig. 5. Although commonly termed an involute, the shape of this top section of the tube when viewed in plan, as in Figs. 2 and 3, is not necessarily a geometrically true involute, an approximation thereto being entirely satisfactory for practical purposes. Approximately one-half of the circumference of the inlet section, marked 36b in Fig. 5 is circular, preferably being an extension of the cylindrical wall of the separating portion of the tube 36 while the remainder 36c of the top inlet section is an arcuate wall which may either have a uniform or varying radius which is greater than the radius of section 36b. The outer end of the arcuate wall section 36c is spaced radially outward from the adjoining end of the circular section 36b and thus provides an inlet 42 of rectangular shape for the gas stream to enter the tube. This inlet 42 is arranged to face forwardly, that is toward gas inlet 24 to receive the stream of gas, as may be seen in Figs. 2 and 3.

As shown clearly in Fig. 3, the separating tubes in each transverse row are arranged in pairs with their gas inlets 42 arranged side-by-side between the two tubes of the pair. The arcuate walls forming these two involute inlets are of opposite hand when viewed in plan and the outer ends of these vertical walls 36c engage each together to prevent gas from passing between them. In the illustrative embodiment of a dust collector shown, there are four tubes in each row, the tubes in each row being divided into two pairs. Six tubes in a row would be divided into three pairs, and so on.

Arcuate walls 36c extend vertically for the full distance between two successive plates of the horizontal wall means. For example in the front row of tubes, the arcuate walls 36c extend between and are connected to horizontal plates 31 and 32 so that plate 31 closes the top of the inlet and plate 32 closes the bottom of the inlet to each tube. These vertically extending wall members are connected in a gas-tight manner to the horizontal plates. In a similar manner the involute inlets for the second transverse row 38 of tubes are closed at the upper and lower ends respectively by plates 32 and 33, and so on for each row. The bottom of the involute inlets of the last row is closed by plate 56 described later.

Arcuate walls 36c have the dual function of directing gas into the separating tubes and of cooperating with the horizontal wall means to isolate the outlet chamber 30 from the remainder of the space inside housing 10. Heretofore separate members have been required for these two purposes. Viewing the horizontal plates in plan as in Fig. 2, it will be noticed that the rear edge of each plate 31, 32 and 33 is straight. The forward edge of each plate 32, 33 and 34 is provided with a series of semi-circular recesses 32a as indicated in Fig. 5. Each of these recesses conforms to the size and exterior shape of the central cylindrical portion of a separating tube and engages one-half of the periphery of a tube. For example, plate 32 has four such recesses 32a which receive the four tubes in the front row, the forward edge of the plate 32 extending to the axis 37, or substantially so.

Collectively, arcuate walls 36c constitute vertically extending wall means which cooperate with the horizontally extending wall means 31, 32, 33, 34 to form a gas-tight partition interposed between inlet 24 and gas outlet 36. This partition cooperates with the housing walls to define the gas outlet chamber 30. The several plates or walls are preferably welded together in order to provide a gas-tight connection between them; but it will be understood that the invention is not necessarily limited to welded joints.

In order to complete the gas-tight barrier or partition, it is preferable to provide at certain locations filler plates or other sealing means. Thus between the end tube at each end of the front row 37 and the adjacent side wall 12 of the housing there is provided vertically extending filler plate 45 that fills in the space between the tube and the housing wall. Alternatively, a seal may be located between the same tube and front wall 13 which, as may be seen in Fig. 3, may engage the tube, or nearly so.

Filler plate 45 extends from plate 31 downwardly to plate 46 which extends horizontally across the housing at the level of the bottom of the gas inlet 24. Likewise a filler plate or other seal 47 is provided between the two interior separating tubes of the front row. If there are more than two pairs of tubes, a similar filler or gas seal is provided between each pair, this filler also extending vertically from plate 31 downwardly to plate 46. Thus plates 31 and 46 define the top and bottom of a gas inlet chamber and plates 47 along with the housing walls and tubes define the sides of the inlet chamber, which chamber communicates with inlet 24.

In order to provide access by the gas stream to inlets of separating tubes in the transverse rows behind the front row, gas passages are provided between tubes 36. Such passages open forwardly to the gas inlet chamber and inlet opening 24 and extend rearwardly in the direction of gas flow to the separating tubes located behind the first row.

It will be remembered that the tubes of a pair having adjoining inlets 42 are spaced apart sufficiently to provide room for the side-by-side inlets 42. Advantage is taken of this fact to locate the gas inlet passages between these more widely spaced tubes. A gas passage consists of an assembly of six side plates 51, 52 and 53 and a floor plate 55, the plates comprising a single passage way being shown in Fig. 6 in their normal relationship with respect to each other but removed from between the separating tubes.

Looking at Figs. 1 and 2 it will be seen that a pair of spaced plates 51 are located between two separating tubes of the first two rows. These two plates 51 are in engagement at their outer faces with the adjoining separating tubes and are connected thereto by a gas-tight connection, preferably being welded to the tubes along the vertical edges of the plates. In addition to being gas tight, the welded joint is strong enough to support the tubes from the side plates. Plate 51 is connected at its top edges to the underside of horizontal plate 32 and extend downwardly to the level of plate 46. From front to rear the plates 52 extend between axes 37 and 38.

Behind the two plates 51 in the direction of gas flow there is a similar pair of plates 52 which are connected at their upper end to the under surface of horizontal plate 33 and extend downwardly to the level of plate 46. From front to rear the two plates 52 extend from axis 38 to axis 39, being suitably joined, as by welding, to the adjoining separating tubes of the second and third rows along the vertical front and rear edges of the plates. A third pair of plates 53 is located rearwardly of plate 52, these plates being located under and connected to horizontal plate 34 and extending between axes 39 and 40. They are joined at their vertical edges to the third and fourth row tubes.

The lower end of each gas passage is closed by horizontal floor plate 55 which is at the level of and extends rearwardly from plate 46. Each plate 55 is only as wide as the spacing between the side walls 51, 52, 53 of the gas passage. Continuing at the same level rearwardly of plate 55 is plate 56 which, like plate 46, extends across the full width of the housing between sides 12 and closes the bottom of the involute inlets of the rear row of tubes.

With this arrangement, the spaced pairs of plates 51, 52, and 53 provide a longitudinally extending gas passage which carries the gas past the successive rows of tubes to the forwardly facing gas inlets 42 of the several rows. Inlets 42 in successive rows of tubes are located at successively lower levels in the passage way, with respect to the direction of the gas flow, so that the stream of incoming gas is confined in the passage way and conducted to the inlets of the separating tubes rearwardly of the front row.

Plates 51, 52, and 53 are preferably connected to the separating tubes in a rigid manner, as by welding, and as a result the weight of the tubes is carried downwardly through these plates to a pair of horizontally extending structural members 60 upon which these plates rest. Structural members 60 rest at their ends upon cross beams of the structural frame work of the housing which transmit the load of the separating tubes to vertically extending legs 11 at each corner of the housing. It will be noticed that, in addition to conducting the gas between the tubes to the inlets of the rearward rows of separating tubes, that the plates 51, 52, and 53 are also load bearing members which transmit the weight of the tubes to the structural frame work.

The operation of the multiple tube cyclonic separator will be apparent from the foregoing description, but it will be here briefly described. The particle laden gas stream enters the gas inlet 24 of the housing and is then divided substantially equally between the inlets 42 of the several separating tubes. Initially, the gas stream is divided into two main portions which flow between longitudinal rows of the tubes 36. Each of these main portions is then subdivided by the successive inlets of the tubes which intercept successively lower portions of the gas stream. While all of the suspended material is ordinarily carried into the tubes, if any of it drops out during movement through the gas inlet passage, it falls on the upper surface of a floor plate 55. Plate 55 being at the level of the bottom of the inlet of the rearmost tubes, the gas stream can sweep the settled particles into the tubes of the last row.

The particle laden gas entering the involute inlet 42 of each of the separating tubes 36 is given a spinning motion by the shape of the inlet and within the tube there is formed a vortex which moves downwardly inside the separating tube. Near the bottom of the tube the vortex turns and spirals upwardly in a vortex of smaller diameter which passes out of the upper end of the tube through the outlet tube 41. The gas stream from each of the outlet tubes is discharged into outlet chamber 30 and leaves the housing by way of gas outlet 26. The particles of solid material suspended in the gas are separated by centrifugal action from the spinning gas and are carried downwardly by the spiral vortex to the bottom of the tube, the separated particles being discharged from each tube through the open lower end of the tube.

From the foregoing description, it will be understood that various changes in the precise arrangement and disposition of parts may be made without departing from the spirit and scope of my invention. Accordingly, it is to be understood that the above description is considered to be illustrative of, rather than limitative upon, the invention as defined by the appended claims.

I claim:

1. Apparatus for separating suspended particles from a stream of gas by centrifugal action, comprising: a housing having a front gas inlet and a gas outlet; horizontal wall means within the housing comprising a plurality of plates extending horizontally across the housing, said plates being spaced apart vertically and disposed at successively lower levels in the direction of gas flow entering said inlet; a transverse row of separating tubes below each horizontal plate with the upper ends of the tubes in each row closed by one of said plates; and vertical wall means comprising a plurality of arcuate walls each forming a forwardly facing involute inlet at the upper end of a separating tube, the arcuate walls for each transverse row of separating tubes extending vertically between two successive ones of said horizontal plates; said horizontal wall means and said vertical wall means cooperating to form a portion at least of a gas-tight partition interposed between the housing inlet and outlet to define an inlet chamber and an outlet chamber within the housing, the partition being exposed at one side to the outlet chamber.

2. Apparatus for separating suspended particles from a stream of gas by centrifugal action, comprising: a housing having a front gas inlet and a gas outlet; horizontal wall means within the housing comprising a plurality of plates extending horizontally across the housing, said plates being spaced apart vertically and disposed at successively lower levels in the direction of gas flow entering said inlet; a transverse row of separating tubes below each horizontal plate with the upper ends of the tubes in each row closed by one of said plates; and vertical wall means comprising a plurality of arcuate walls each forming a forwardly facing involute inlet at the upper end of a separating tube, the arcuate walls for each transverse row of separating tubes extending vertically between two successive ones of said horizontal plates that close the top and bottom of the involute inlets, the arcuate walls also being arranged in pairs of which the forward ends engage each other; the vertical walls means also including vertical filler plates between said arcuate walls and the housing and between pairs of said vertical walls; said horizontal wall means and said vertical wall means cooperating to form a portion at least of a continuous wall interposed between the housing inlet and outlet to define an inlet chamber and an outlet chamber within the housing, the partition being exposed at one side to the outlet chamber.

3. Apparatus for separating suspended particles from a stream of gas by centrifugal action, comprising: a housing having a front gas inlet and a gas outlet; a plurality of horizontal plates within the housing extending across the housing, said plates being spaced apart vertically and disposed at successively lower levels in the direction of gas flow entering said inlet; a transverse row of separating tubes below each horizontal plate with the upper ends of the tubes in each row closed by one of said plates; and vertical wall means comprising a plurality of arcuate walls each forming a forwardly facing involute inlet at the upper end of each separating tube, the arcuate walls for each row of separating tubes extending vertically between two successive ones of said horizontal plates that close the top and bottom of the involute inlets, the arcuate walls also being arranged in pairs of which the forward ends engage each other; the vertical wall means also including vertical filler plates between said arcuate walls and the housing and between pairs of said vertical walls; said horizontal wall means and said vertical wall means cooperating to form a portion at least of a continuous wall interposed between the housing inlet and outlet to define an inlet chamber and an outlet chamber within the housing, the partition being exposed at one side to the outlet chamber.

4. Apparatus for separating suspended particles from a stream of gas by centrifugal action, comprising: a housing having a front gas inlet and a gas outlet; a pair of horizontal plates within the housing extending across the housing, said plates being spaced apart vertically and disposed at successively lower levels in the direction of gas flow entering said inlet; a transverse row of separating tubes below the upper one of the horizontal plate with the upper ends of all tubes in the row closed by said upper plate; and an arcuate wall forming a forwardly facing involute inlet at the upper end of each separating tube, the arcuate walls for all separating tubes in the row extending vertically between the two horizontal plates, said plates engaging the separating tubes respectively above and below the arcuate walls to close the top and bottom of the inlets; said horizontal plates and said arcuate wall members cooperating to form a portion at least of a gas-tight partition interposed between the housing inlet and outlet to define an inlet chamber and an outlet chamber within the housing, the partition being exposed at one side to the outlet chamber.

References Cited in the file of this patent
UNITED STATES PATENTS

| | | |
|---|---|---|
| 2,439,850 | Heller | Apr. 20, 1948 |
| 2,515,894 | Polk | July 18, 1950 |
| 2,662,610 | Heinrich | Dec. 15, 1953 |
| 2,768,744 | McGrane | Oct. 30, 1956 |